United States Patent
Skarve et al.

(10) Patent No.: US 11,646,835 B2
(45) Date of Patent: May 9, 2023

(54) TRANSMISSION OF A PACKET DATA CONVERGENCE PROTOCOL (PDCP) PROTOCOL DATA UNIT (PDU) IN A WIRELESS COMMUNICATION NETWORK

(71) Applicant: Telefonaktiebolaget LM Ericsson (publ), Stockholm (SE)

(72) Inventors: Martin Skarve, Enebyberg (SE); Torbjörn Örtengren, Linköping (SE); Samir Shah, Ottawa (CA); Svante Järvsträt, Linköping (SE); Stefan Eng, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 282 days.

(21) Appl. No.: 17/283,579

(22) PCT Filed: Sep. 19, 2019

(86) PCT No.: PCT/SE2019/050892
§ 371 (c)(1),
(2) Date: Apr. 8, 2021

(87) PCT Pub. No.: WO2020/076208
PCT Pub. Date: Apr. 16, 2020

(65) Prior Publication Data
US 2021/0385027 A1 Dec. 9, 2021

Related U.S. Application Data

(60) Provisional application No. 62/742,494, filed on Oct. 8, 2018.

(51) Int. Cl.
*H04L 1/00* (2006.01)
*H04L 1/1867* (2023.01)
(Continued)

(52) U.S. Cl.
CPC .......... *H04L 1/1874* (2013.01); *H04L 1/1887* (2013.01); *H04L 47/34* (2013.01); *H04L 69/03* (2013.01); *H04W 80/02* (2013.01)

(58) Field of Classification Search
None
See application file for complete search history.

(56) References Cited

U.S. PATENT DOCUMENTS 5,222,061 A   6/1993  Doshi et al.
9,838,282 B2 * 12/2017 Dudda ................ H04W 36/023
(Continued)

FOREIGN PATENT DOCUMENTS

EP   1204249 A1   5/2002
EP   1315341 A1   5/2003
(Continued)

OTHER PUBLICATIONS

3GPP, "3GPP TS 38 425 V15.3.0", 3rd Generation Partnership Project; Technical Specification Group Radio Access Network; NG-RAN; NR user plane protocol (Release 15), Sep. 2018, 1-22.

*Primary Examiner* — Gerald A Smarth
(74) *Attorney, Agent, or Firm* — Christopher & Weisberg, P.A.

(57) ABSTRACT

A method performed by a network node for transmission of a Packet Data Convergence Protocol, PDCP, Protocol Data Unit, PDU, to a wireless communications device is provided. The network node and the wireless communications device operate in a wireless communications network. The network node arranges (505) a number of PDCP PDUs in a numerical order based on their respective PDCP Sequence Number, SN. The number of PDCP PDUs is taken from a first set of PDCP PDUs comprising one or more first time transmitted PDCP PDUs and from a second set of PDCP PDUs comprising one or more retransmitted PDCP PDUs. The one or more first time transmitted PDCP PDUs and the (Continued)

one or more retransmitted PDCP PDUs are received from a controlling node. The network node transmits (506) the number of the PDCP PDUs in the numerical order to the wireless communications device 120.

19 Claims, 11 Drawing Sheets

(51) Int. Cl.
  *H04L 47/34* (2022.01)
  *H04L 69/00* (2022.01)
  *H04W 80/02* (2009.01)

(56) References Cited

U.S. PATENT DOCUMENTS

| | | | |
|---|---|---|---|
| 10,812,230 B2* | 10/2020 | Kim | H04W 72/27 |
| 11,129,233 B2* | 9/2021 | Zhang | H04L 69/04 |
| 2017/0041767 A1 | 2/2017 | Vajapeyam et al. | |
| 2017/0085492 A1 | 3/2017 | Xiao et al. | |
| 2018/0083688 A1 | 3/2018 | Agiwal et al. | |
| 2020/0044792 A1* | 2/2020 | Vaidya | H04L 1/1861 |

FOREIGN PATENT DOCUMENTS

| | | |
|---|---|---|
| EP | 1364482 B1 | 9/2007 |
| JP | 2013062884 A | 4/2013 |

* cited by examiner

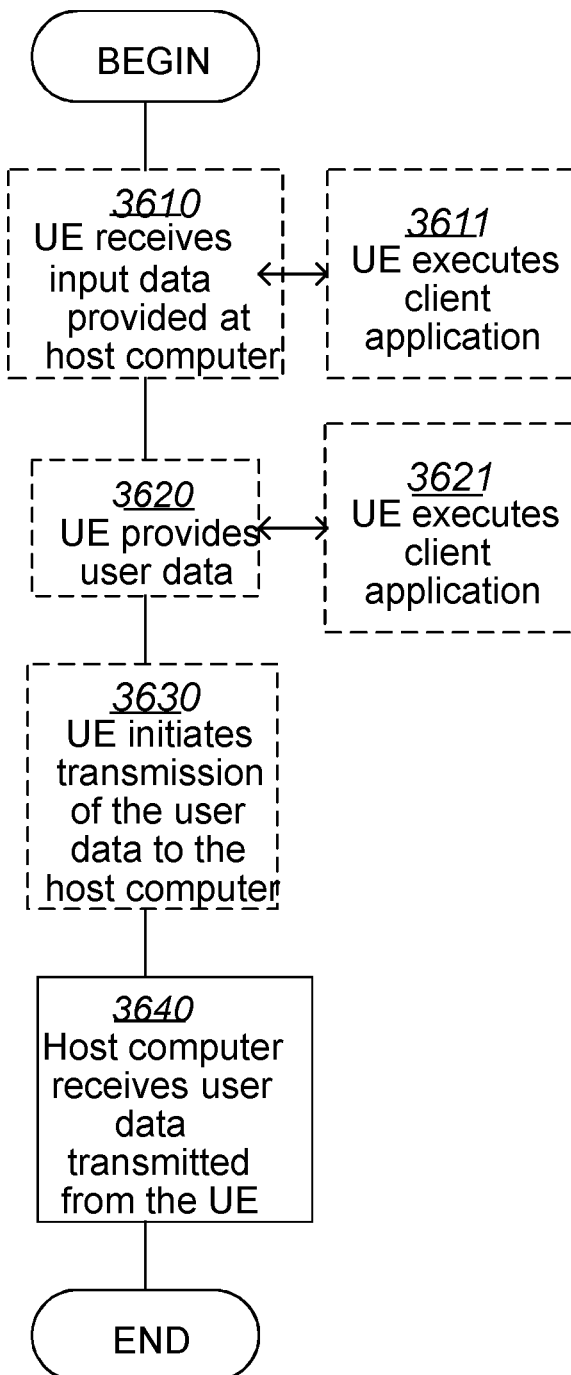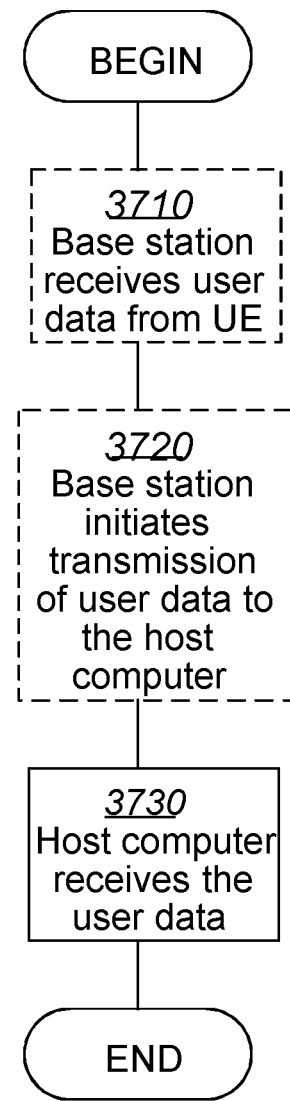
FIG. 12
FIG. 13

TRANSMISSION OF A PACKET DATA CONVERGENCE PROTOCOL (PDCP) PROTOCOL DATA UNIT (PDU) IN A WIRELESS COMMUNICATION NETWORK

TECHNICAL FIELD

Embodiments herein relate to a network node, and a method therein. In particular, they relate to transmitting a Packet Data Convergence Protocol (PDCP) Protocol Data Unit (PDU) to a wireless communications device.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) and Next Generation (NG). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In NG-RAN dual connectivity (DC) is expected to be frequently used. One DC configuration is when an eNB and a gNB are connected with the same UE (called Enhanced DC (EN-DC), and another configuration is when two gNBs are connected with the same UE. When DC is setup for a UE it allows traffic to be sent and received from the UE to both nodes involved in the DC connection. A DC connection may be setup and released dynamically based on various characteristics, such as whether a good enough radio connection can be setup or not with the UE from a specific node (gNB or eNB).

FIG. 1 shows an overview of the architecture in NG-RAN where gNBs may be interconnected through an Xn interface. A gNB may comprise a gNB-Central Unit (CU) and gNB-Distributed Unit (DU)s. A gNB-CU and a gNB-DU may be connected via F1 logical interface. One gNB-DU is connected to only one gNB-CU.

Data transmission for dual connectivity is controlled by a controlling node called a Central Unit (CU), and the network nodes (eNB or gNB) for which the CU controls the data traffic are referred to as distributed units, called DUs. The CU may be collocated within the same node, e.g. a network node such as eNB or gNB, as one of the DUs or it may be located in its own node, see FIG. 2 depicting two examples of DC deployments. xNB is either a gNB or an eNB.

When a UE has a Data Radio Bearer (DRB) connection with only one DU, and hence is not using dual connectivity, the UE has a single DC leg, and when a UE has a DRB connection with two DUs the UE has two DC legs and is in dual connectivity. In the case when the UE has two DC legs, the network may actively use either one or both of the legs for the ongoing traffic. When only one leg is used for traffic it is in this document referred to as "non-aggregated" data transmission and when both legs are used for traffic it is in this document referred to as "aggregated" data transmission.

A UE that has an ongoing data traffic for a DRB connection and which is capable of dual connectivity, may occasionally be reconfigured by the network from having a single leg connection to dual connectivity and vice versa, and furthermore, when the DRB is configured for dual connectivity, the network may dynamically change between using aggregated and non-aggregated data transmission for the DRB.

3GPP has agreed that CU-UP may retransmit Packet Data Convergence Protocol (PDCP) Protocol Data Unit (PDU)s. Such retransmitted PDUs shall be marked with a Retransmission flag in the frame when transmitted from the CU-UP to the DU. See 3GPP TS 38.425 ref. It is also agreed to allow sending feedback DL Data Delivery Status messages (DDDS) from DU to CU-UP including. The DDDS may include information elements as "Highest successfully delivered NR PDCP Sequence Number", "Highest transmitted NR PDCP Sequence Number", "Highest successfully delivered retransmitted NR PDCP Sequence Number" and "Highest retransmitted NR PDCP Sequence Number" information elements (IE), see 3GPP TS 38.425. This means that all PDUs marked as retransmitted when transmitted from CU-User Plane (U) to DU also shall be separated as retransmitted when reported in the DDDS and acknowledged to the CU-UP.

SUMMARY

An object of embodiments herein is to improve the performance of the network such as a wireless communications network.

According to an aspect of embodiments herein, the object is achieved by a method performed by a network node for transmission of a Packet Data Convergence Protocol, PDCP, Protocol Data Unit, PDU, to a wireless communications device. The network node and the wireless communications device operate in a wireless communications network.

The network node arranges a number of PDCP PDUs in a numerical order based on their respective PDCP Sequence Number, SN. The number of PDCP PDUs is taken from a first set of PDCP PDUs comprising one or more first time transmitted PDCP PDUs and from a second set of PDCP PDUs comprising one or more retransmitted PDCP PDUs. The one or more first time transmitted PDCP PDUs and the one or more retransmitted PDCP PDUs are received from a controlling node.

The network node transmits the number of the PDCP PDUs in the numerical order to the wireless communications device.

According to another aspect of embodiments herein, the object is achieved by a network node, for transmission of a Packet Data Convergence Protocol, PDCP, Protocol Data Unit, PDU, to a wireless communications device. The network node and the wireless communications device are configured to operate in a wireless communications network. The network node is further configured to:

Arrange a number of PDCP PDUs in a numerical order based on their respective PDCP Sequence Number, SN, wherein the number of PDCP PDUs are taken from a first set of PDCP PDUs comprising one or more first time transmitted PDCP PDUs and from a second set of PDCP PDUs comprising one or more retransmitted PDCP PDUs, and wherein the one or more first time transmitted PDCP PDUs and the one or more retransmitted PDCP PDUs are received from a controlling node, and Transmit the number of the PDCP PDUs in the numerical order to the wireless communications device.

Embodiments herein provide an improved retransmission handling.

Through the reordering of first time transmission PDCU PDUs and retransmitted PDCP PDUs in the network node, the PDUs can be transmitted to the UE in correct PDCP SN order with improved end user performance as a result.

BRIEF DESCRIPTION OF THE DRAWINGS

Examples of embodiments herein are described in more detail with reference to attached drawings in which:

FIGS. 10-13 are flowcharts illustrating methods implemented in a communication system including a host computer, a base station and a user equipment.

DETAILED DESCRIPTION

As a part of developing embodiments herein the inventors identified a problem which first will be discussed.

Figure 1:
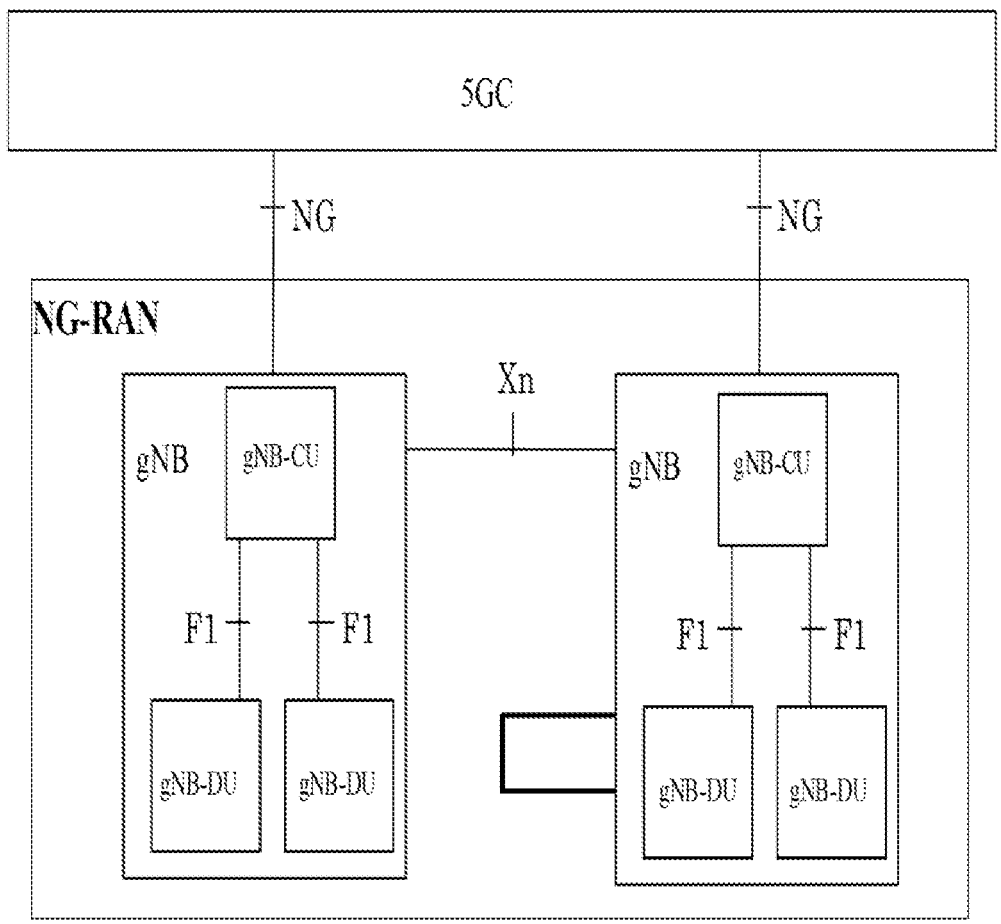
FIG. 1 is a schematic block diagram illustrating prior art.
Figure 2:
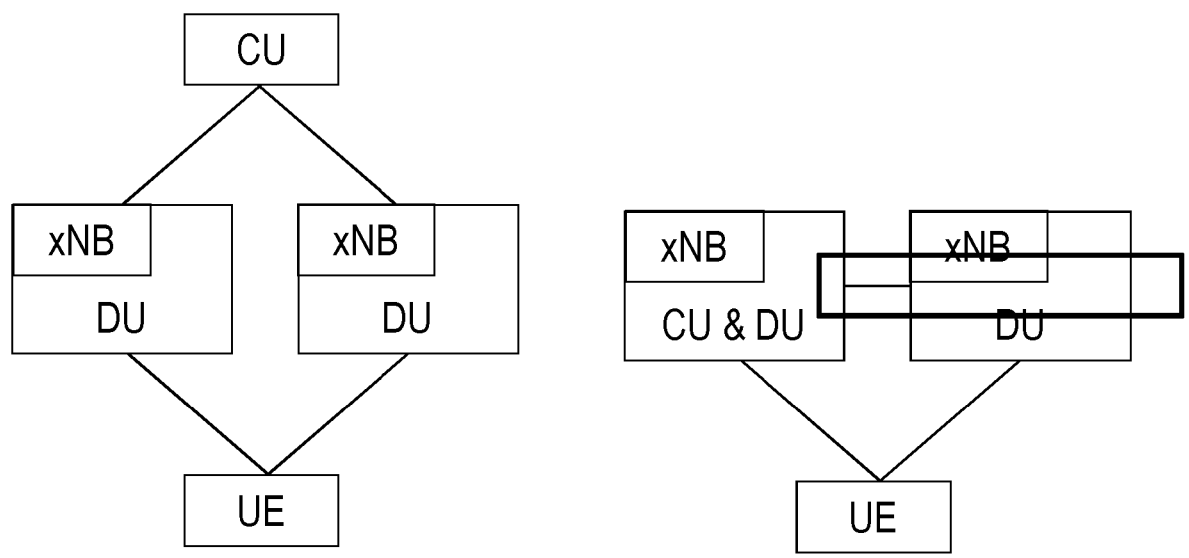
FIG. 2 is a schematic block diagram illustrating prior art.
Figure 3:
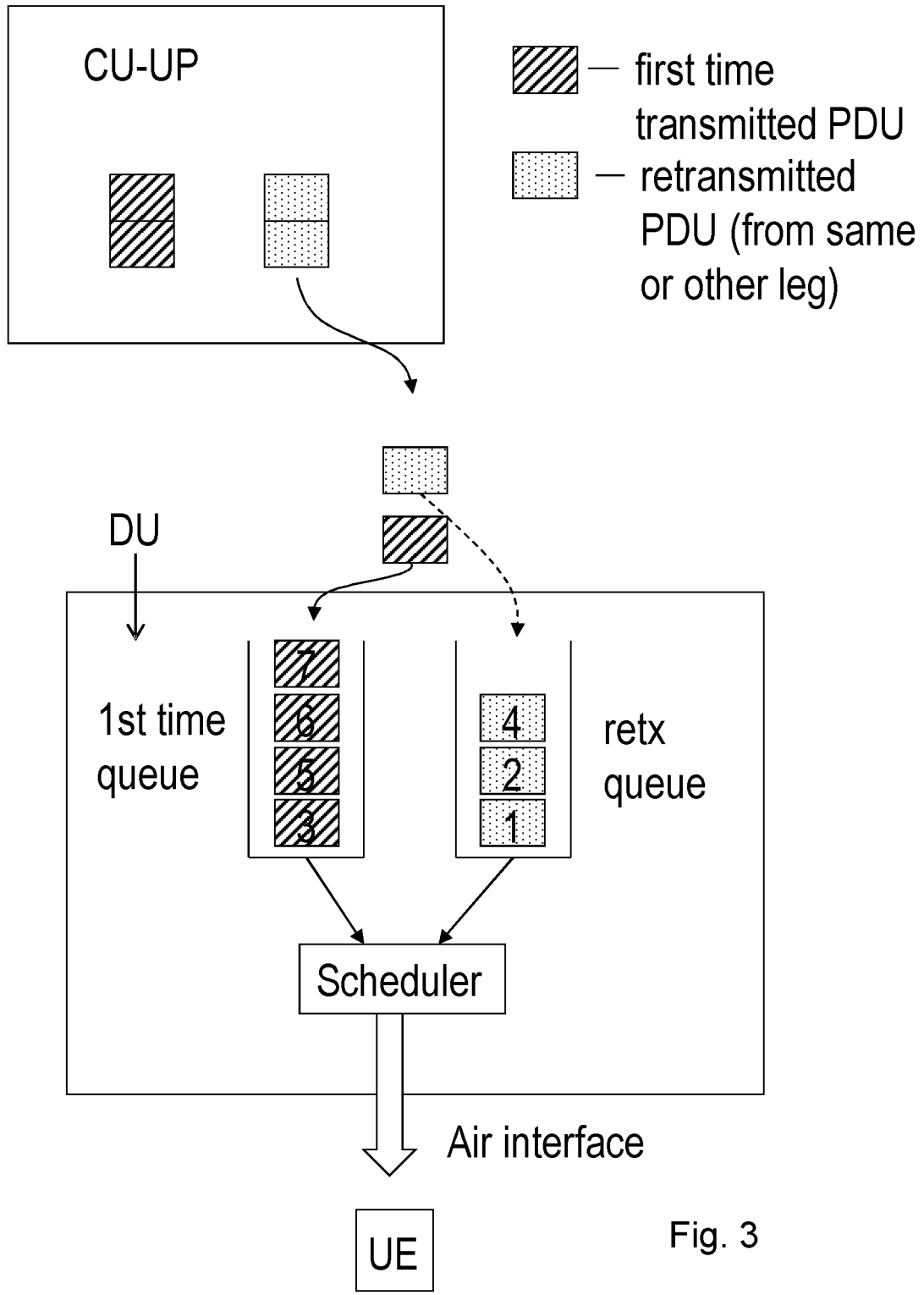
FIG. 3 is a schematic block diagram illustrating prior art.

The current solutions according to prior art assume two separate queues in the DU for each DRB; one for first time transmitted PDCP PDUs and one for Retransmitted (retx) PDCP PDUs, where the PDUs in the Retransmitted PDCP PDU queue has absolute priority over PDUs in the first time transmitted PDCP PDU queue. See FIG. 3.

The problems with such solution are:
PDUs arriving to the Retransmission queue out of order (for example due to out of order delivery from CU-UP) will also be retransmitted out of order.
This causes out of order delivery to the UE and may therefore reduce performance and may even in some scenarios trigger packet discard at expiry of the reordering timer in the UE.
PDUs arriving to the Retransmission queue are transmitted ahead of any PDU in the First time transmission queue. In case of a large number of PDUs in the First time transmission queue, it may happen that PDCP PDUs in the Retransmission PDUs are transmitted to the UE ahead of First time PDUs with lower PDCP SN.

Above problems causes out of order delivery to the UE and may therefore reduce end user performance and may even in some scenarios trigger packet discard at expiry of the reordering timer in the UE, which causes even further reduced end user performance.

PDUs received out of ordered will be queued up waiting for missing PDCP SN why the end user will experience shorter latency if no reordering occur. A large reordering will additionally (when reordering timer expiries in UE) cause packet discard, and this is reducing end user performance even further.

An object of embodiments herein may therefore be to improve end user performance in a wireless communications network.

Embodiments herein relate to improved retransmission handling.

According to some example embodiments herein and as mentioned above, reordering of first time transmission PDCU PDUs and retransmitted PDCP PDUs in the network node such as its DU is performed. The PDUs can then be transmitted to the UE in correct PDCP SN order with improved end user performance as a result.

Figure 4:
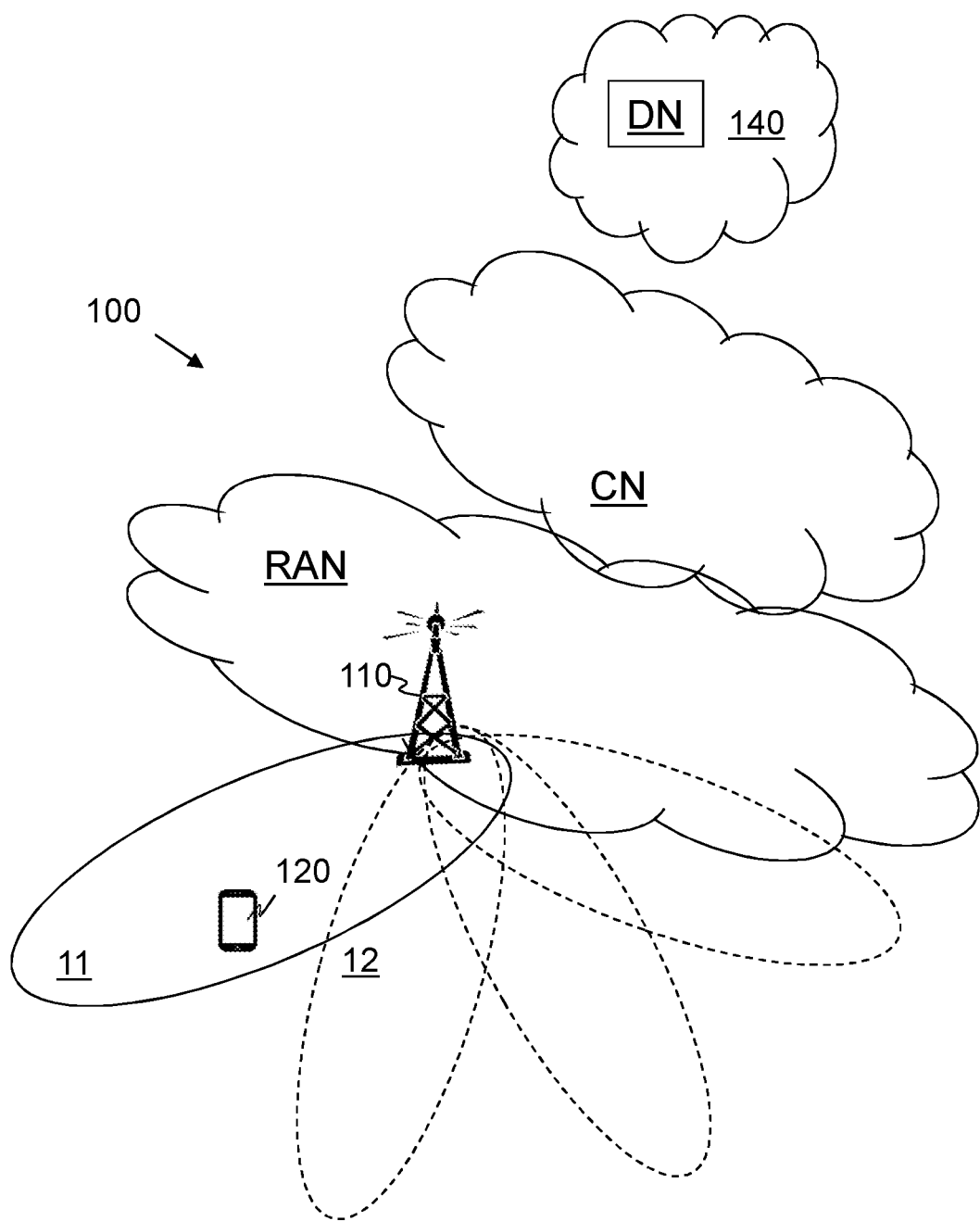
FIG. 4 is a schematic block diagrams illustrating embodiments of a wireless communications network.

Embodiments herein relate to wireless communication networks in general. FIG. 4 is a schematic overview depicting a wireless communications network 100. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, UEs such as a wireless communications device 120 operate. The UE 120 may be a mobile station, a non-access point (non-AP) STA, a STA, a wireless terminals, and is capable to communicate via one or more Access Networks (AN), e.g. RAN, to one or more core networks (CN). It should be understood by the skilled in the art that "wireless communications device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 100 comprises one or more radio network nodes such as a network node 110 e.g. comprising one or more DUs and one or more CUs a. The radio network node 110 e.g. provides multiple Public Land Mobile Networks (PLMNs) and where each radio network node also provide radio coverage over a respective geographical area referred to as one or more cells 11, 12, which may also be referred to as a beam or a beam group of a first radio access technology (RAT), such as 5G, LTE, Wi-Fi or similar. The network node 110 may be a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with the wireless communications device 120 within the service area served by the network node 110 depending e.g. on the first radio access technology and terminology used.

Methods herein may be performed by the network node 110 such as e.g. its DU. As an alternative, any Distributed Node (DN) and functionality, e.g. comprised in a cloud 140 as shown in FIG. 4, may be used for performing or partly performing the methods. The network aspects of embodiments herein may be deployed in a cloud environment.

Figure 5:
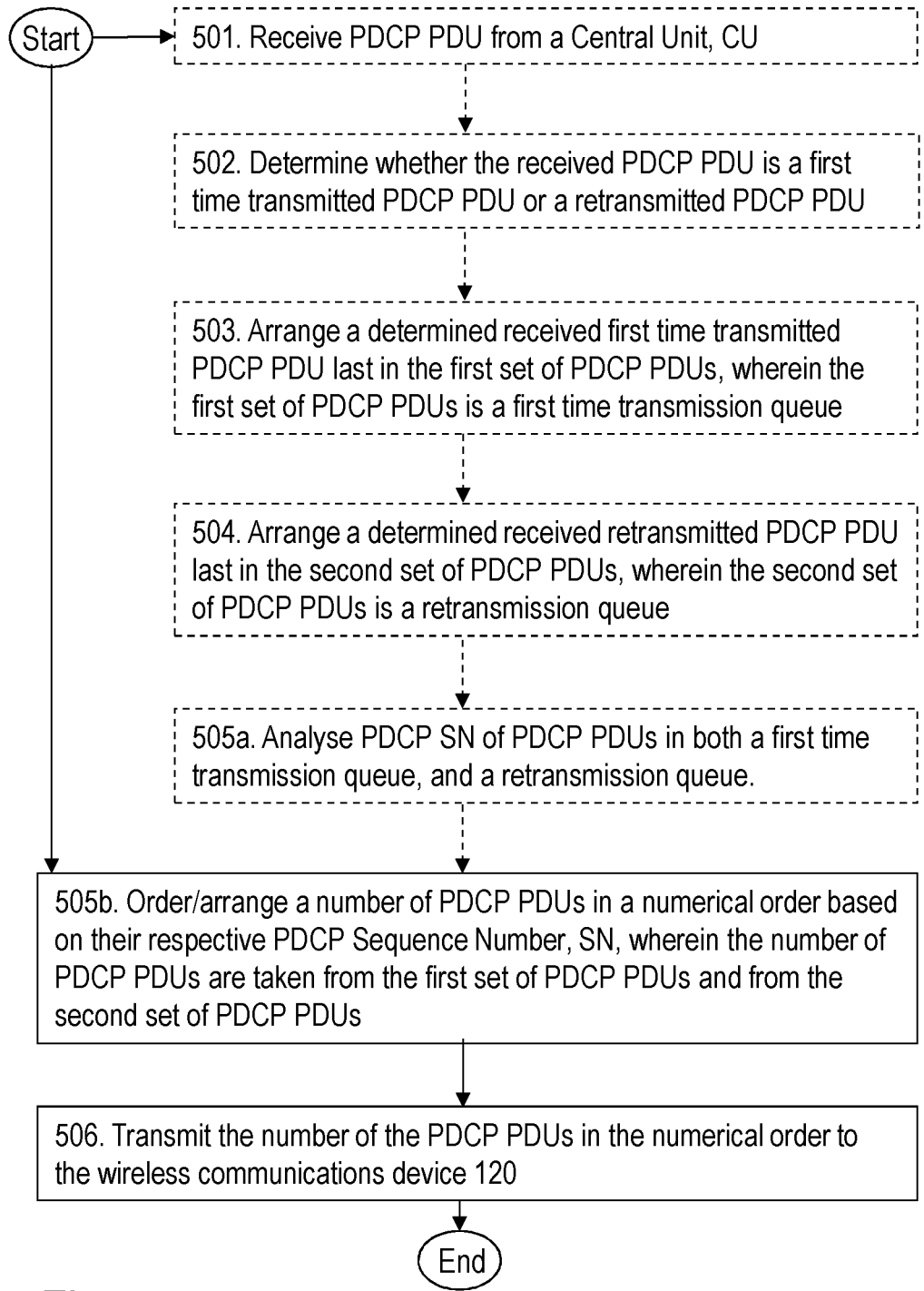
FIG. 5 is a flowchart depicting embodiments of a method in a network node.

FIG. 5 shows an example method performed by a network node 110 e.g. a DU, or comprising a DU, for e.g. transmission of a PDCP PDU, to the wireless communications device 120. As mentioned above, the network node 110 and the wireless communications device 120 operate in the wireless communications network 100, e.g. a communications network providing dual connectivity or a communications network wherein PDCP and lower layers are in different nodes or possibly in different software functions.

In short, the method may comprise any of the actions below.

In Action 501, the network node 110 may receive a PDCP PDU from the CU and in Action 502 determine whether the received PDCP PDU is a first time transmitted PDCP PDU or a retransmitted PDCP PDU.

Action 503. The network node 110 may then arrange a determined received first time transmitted PDCP PDU last in the first set of PDCP PDUs wherein the first set of PDCP PDUs is a first time transmission queue and in Action 504, arrange a determined received retransmitted PDCP PDU last in the second set of PDCP PDUs, wherein the second set of PDCP PDUs is a retransmission queue In Action 505, the network node 110 orders (also referred to as arranges or puts) a number of PDCP PDUs in a numerical order based on their respective PDCP Sequence Number (SN). The number of PDCP PDUs are taken from a first set of PDCP PDUs comprising one or more first time transmitted PDCP PDUs, and from a second set of PDCP PDUs comprising one or more retransmitted PDCP PDUs. The one or more first time transmitted PDCP PDUs and the one or more retransmitted PDCP PDUs are received from a controlling node, e.g. a Central Unit (CU) The CU may e.g. be comprised in the network node 110 or be connected to the network node 110. The CU operate in the wireless communications network 100.

In Action 506, the network node 110 transmits the number of the PDCP PDUs in the numerical order to the wireless communications device (120).

The PDCP PDU may comprise an indication, e.g. a flag, indicating whether the PDCP PDU is first time transmitted or retransmitted.

The method will now be described in more detail.

The method is performed by the network node 110 for transmission of a PDCP PDU to the wireless communications device 120. The network node 110 and the wireless communications device 120 operate in a wireless communications network 100.

The network node 110 may be represented by a DU or may comprise a DU.

The wireless communications network 100 may relates to any one out of: A communications network providing dual connectivity, or a communications network wherein PDCP and lower layers are in different nodes or in different software functions.

According to embodiments herein, the network node 110 will arrange a reordering of first time transmission PDCU PDUs and retransmitted PDCP PDUs so that the PDUs can be transmitted to the UE in correct PDCP SN order with improved end user performance as a result.

According to an example scenario, the network node 110 receives e.g. from a CU, PDCP PDUs that is to be transmitted to the wireless communications device 120. The received PDCP PDUs are a mix of first time transmitted PDCP PDUs and a retransmitted PDCP PDUs.

The method comprises the following actions which may be taken in any suitable order. Optional actions are marked as dashed boxes in FIG. 5.

In some embodiments optional actions 501-504 are taken for each of a number of PDCP PDUs:

Action 501.

Thus, the network node 110 receives a PDCP PDU, e.g. comprising one or more PDCP PDUs, from the CU.

Action 502.

The received PDCP PDUs are a mix of first time transmitted PDCP PDUs and retransmitted PDCP PDUs, so e.g. for each received PDCP PDU, the network node 110 determines whether the received PDCP PDU is a first time transmitted PDCP PDU or a retransmitted PDCP PDU.

Every PDCP PDU may besides a PDCP SN also include a so called a NR-User plane (U) SN. NR-U SN may only be used to identify the order of the packets sent over the Transport Network (TN) between CU and DU or between eNB and gNB. The received PDCP PDUs may in some embodiments first be reordered according to NR-U SN order before determining whether the received PDCP PDU is a first time transmitted PDCP PDU or a retransmitted PDCP PDU.

Action 503.

The network node 110 arranges a determined received first time transmitted PDCP PDU last in the first set of PDCP PDUs, wherein the first set of PDCP PDUs is a first time transmission queue. Thus network node 110 arranges each of the determined received first time transmitted PDCP PDU out of the received PDCP PDUs, last in the first set of PDCP PDUs, i.e. in the first time transmission queue.

Action 504.

The network node 110 arranges a determined received retransmitted PDCP PDU last in the second set of PDCP PDUs, wherein the second set of PDCP PDUs is a retransmission queue. Thus network node 110 arranges each of the determined received retransmitted PDCP PDU out of the received PDCP PDUs, last in the second set of PDCP PDUs, i.e. in the retransmission queue.

Action 505*a*.

In some embodiments, the network node 110 analyses the PDCP SN of the received PDCP PDUs in both the first time transmission queue, and the retransmission queue.

Action 505*b*.

The network node 110 then arranges a number of PDCP PDUs in a numerical order based on their respective PDCP SN. This is also referred to as reordering of first time transmission PDCU PDUs and retransmitted PDCP PDUs into a new queue. The number of PDCP PDUs referred to here, relates to the received PDCP PDUs which are divided into the first time transmission and retransmission queues. The number of PDCP PDUs is taken from the first set of PDCP PDUs comprising one or more first time transmitted PDCP PDUs and from the second set of PDCP PDUs comprising one or more retransmitted PDCP PDUs. The one or more first time transmitted PDCP PDUs and the one or more retransmitted PDCP PDUs are received from the controlling node.

The controlling node may be represented by a CU, which CU may be comprised in the network node 110 or may be connected to the network node 110 and is operating in the wireless communications network 100.

A PDCP PDU received from the CU may comprise an indication, e.g. a flag, indicating whether the PDCP PDU is first time transmitted or retransmitted.

In some embodiments, the arranging of the number of PDCP PDUs in a numerical order based on their respective PDCP SN is triggered at a selected event. The selected event may e.g. comprise anyone or more out of: A retransmitted PDCP PDU arrives to an empty retransmission queue, a preconfigured time at which time a predefined number of PDUs have arrived in the Retransmission queue, when a predefined number of PDCP PDUs have arrived in the Retransmission queue, and when there are PDCP PDU(s) in the Retransmission queue.

In the embodiments, where the network node 110 has analysed the PDCP SN of PDCP PDUs in both the first time transmission queue and the retransmission queue in Action 505*a*, the network node 110 may arrange the number of PDCP PDUs in a numerical order based on their respective PDCP SN by reallocating the analysed PDUs in a new queue, based on PDCP SN of each PDU.

Action 506.

The network node 110 then transmits the number of the PDCP PDUs in the numerical order to the wireless communications device 120.

Through the reordering of first time transmission PDCU PDUs and retransmitted PDCP PDUs in the network node 110, the PDUs can be transmitted to the UE in correct PDCP SN order with improved end user performance as a result.

The embodiments described above will now be further explained and exemplified. PDCU PDUs in the example below are referred to as PDUs for simplicity.

Figure 6:
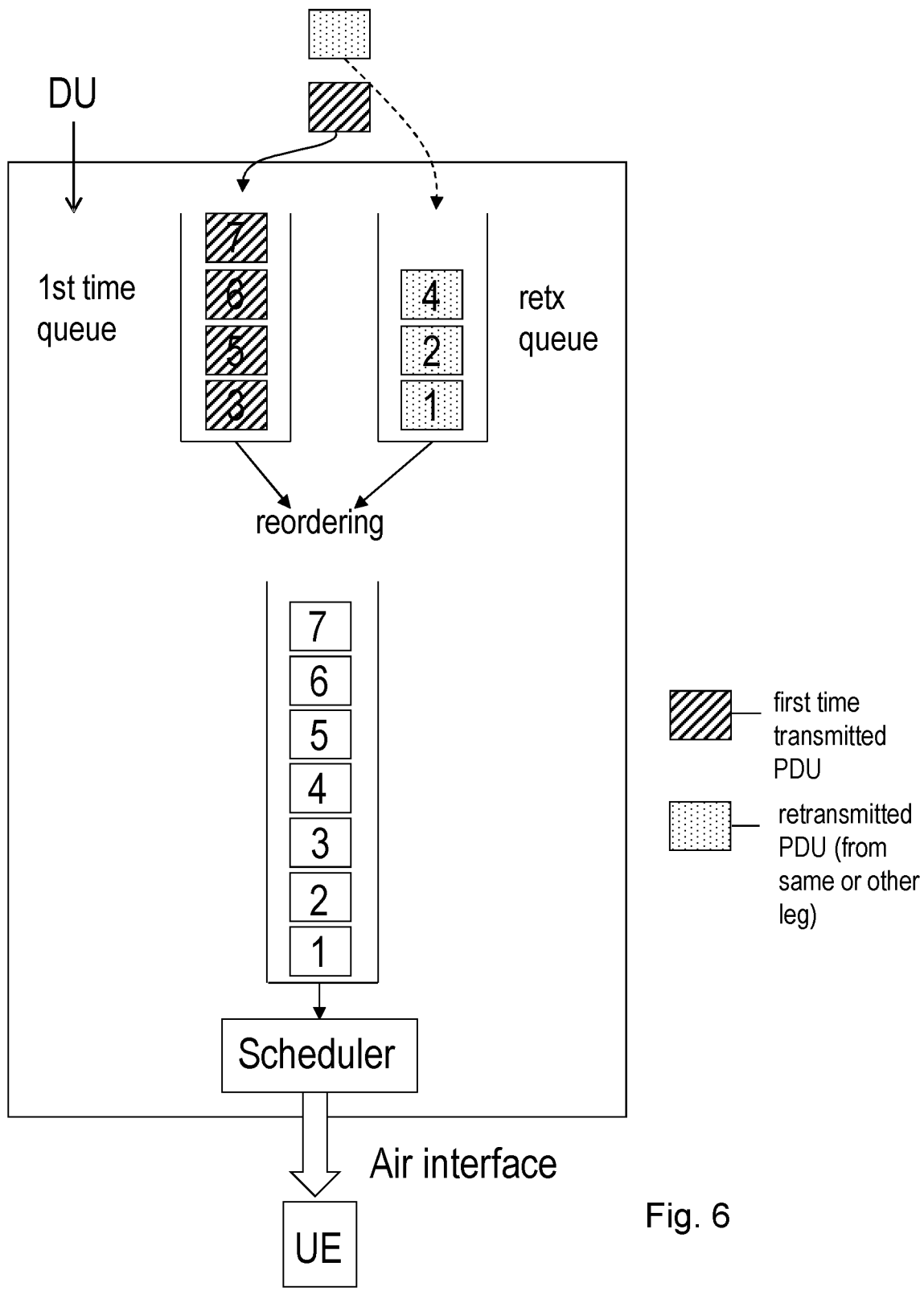
FIG. 6 is a schematic block diagram illustrating an embodiment herein.

According to some example embodiments herein, see FIG. 6, PDUs arriving to the network node 110, such as its DU, will be assigned to one queue each:

First time transmitted PDUs, e.g. an indication such as a no ReTx flag in PDU Type 0, are put last in first time transmission queue. This is the majority of the PDUs in most scenarios.

Retransmitted PDUs, e.g. marked with an indication such as marked with ReTx flag in PDU Type 0, are put last in Retransmission queue.

At a selected event, e.g. when a retx PDU arrives to an empty Retx queue or when a preconfigured time since that time or when x number of PDUs have arrived etc., when there is/are PDU(s) in the Retransmission queue, the PDU reordering in the DU is triggered.

The network node 110 such as its DU reordering the PDUs, may analyse the PDCP SN of the PDUs in both first time transmission and the Retransmission queues and reallocates the PDUs in a new queue, this time based on PDCP SN of each PDU. The Radio Link Control (RLC), Medium Access Control (MAC), scheduling or similar entity will at scheduling take PDUs from the new queue with reordered PDUs, why all PDUs on the leg are sent in order towards the UE 120.

In some embodiments, the network node 110 arranging the number of PDCP PDUs in a numerical order based on their respective PDCP SN comprises that an RLC, MAC, scheduling or similar entity in the network node 110 may schedule PDUs immediately from the initial 2 queues in the same fashion and not create a new queue.

It should be noted that Hybrid Automatic Repeat Request (HARQ) and RLC retransmissions may impact that not every PDU arrives in that order to the UE 120.

Embodiments herein may apply both to DC and not DC but using a split node. I.e. any scenario when PDCP and lower layers are in different nodes or possibly software (SW) function.

Examples herein have focus on DC because this is the most likely scenario: e.g. when there is ongoing transmission on 2 legs and one leg suddenly performs badly, Leading to retransmissions of PDUS to the other leg. However, possibly this may happen at single leg transmission, but once again, this is much more unlikely.

DU=Distributed Unit

CU=Central Unit

Figure 7:
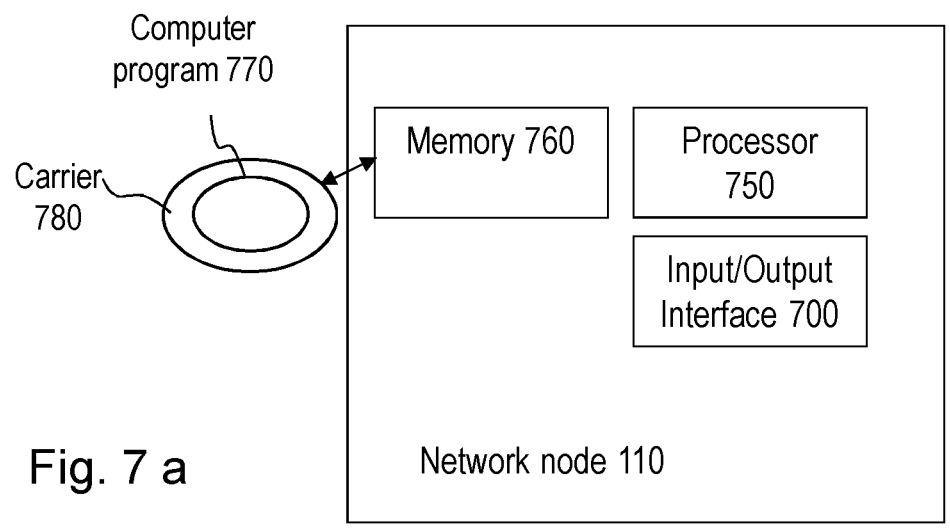
FIGS. 7 a-b are schematic block diagrams illustrating an embodiment of a network node.
Figure 7:
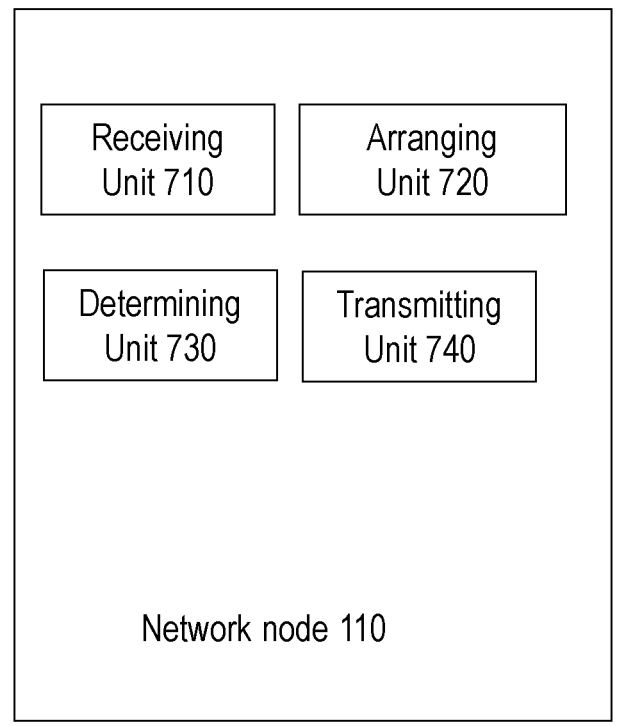

FIGS. 7 *a* and *b* shows an example of arrangements in the network node 110.

The network node 110 may comprise an input and output interface 700 configured to communicate with each other. The input and output interface may comprise a wireless receiver (not shown) and a wireless transmitter (not shown).

The network node 110 may comprise a receiving unit 710, an arranging unit 720, a determining unit 730 and a transmitting unit 740 to perform the method actions as described herein.

The embodiments herein may be implemented through a respective processor or one or more processors, such as the processor 750 of a processing circuitry in the network node 110 depicted in FIG. 7*a*, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise respective a memory 760 comprising one or more memory units. The memory comprises instructions executable by the processor in network node 110. The memory is arranged to be used to store instructions, PDUs, data, parameters, configurations, and applications to perform the methods herein when being executed in the network node 110.

In some embodiments, are computer program 770 comprises instructions, which when executed by the at least one processor 750, cause the at least one processor 750 of the network node 110 to perform the actions above.

In some embodiments, a respective carrier 780 comprises the computer program 770, wherein the carrier 780 is one of an electronic signal, an optical signal, an electromagnetic signal, a magnetic signal, an electric signal, a radio signal, a microwave signal, or a computer-readable storage medium.

Those skilled in the art will also appreciate that the functional units in the network node 110, described below may refer to a combination of analog and digital circuits, and/or one or more processors configured with software and/or firmware, e.g. stored in the UE 120, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Below, some example embodiments 1-20 are shortly described. See e.g. FIGS. 4, 5, 6, 7a and 7b.

Embodiment 1

A method performed by a network node (110) e.g. a Distributed Unit, DU, or comprising a DU, for e.g. transmission of a Packet Data Convergence Protocol, PDCP, Protocol Data Unit, PDU, to a wireless communications device (120), wherein the network node (110) and the wireless communications device (120) operate in a wireless communications network (100), e.g. a communications network providing dual connectivity or a communications network wherein PDCP and lower layers are in different nodes or possibly in different software functions, wherein the method comprises:
 ordering/arranging/putting (505) a number of PDCP PDUs in a numerical order based on their respective PDCP Sequence Number, SN, wherein the number of PDCP PDUs are taken from a first set of PDCP PDUs comprising one or more first time transmitted PDCP PDUs and from a second set of PDCP PDUs comprising one or more retransmitted PDCP PDUs, and wherein the one or more first time transmitted PDCP PDUs and the one or more retransmitted PDCP PDUs are received from a controlling node, e.g. a Central Unit, CU, e.g. comprised in the network node (110) or connected to the network node (110) and operating in the wireless communications network (100); and
 transmitting (506) the number of the PDCP PDUs in the numerical order to the wireless communications device (120).

Embodiment 2

The method of embodiment 1, further comprising:
receiving (501) a PDCP PDU from the CU;
determining (502) whether the received PDCP PDU is a first time transmitted PDCP PDU or a retransmitted PDCP PDU;
arranging (503) a determined received first time transmitted PDCP PDU last in the first set of PDCP PDUs, wherein the first set of PDCP PDUs is a first time transmission queue; and
arranging (504) a determined received retransmitted PDCP PDU last in the second set of PDCP PDUs, wherein the second set of PDCP PDUs is a retransmission queue.

Embodiment 3

The method of embodiment 1 or 2, wherein the PDCP PDU comprises an indication, e.g. a flag, indicating whether the PDCP PDU is first time transmitted or retransmitted.

Embodiment 4

A network node (110) e.g. a Distributed Unit, DU, or comprising a DU, for e.g. transmission of a Packet Data Convergence Protocol, PDCP, Protocol Data Unit, PDU, to a wireless communications device (120), wherein the network node (110) and the wireless communications device (120) are configured to operate in a wireless communications network (100), e.g. a communications network providing dual connectivity or a communications network wherein PDCP and lower layers are in different nodes or possibly in different software functions, wherein the network node (110) is configured to:
 order/arrange/put a number of PDCP PDUs in a numerical order based on their respective PDCP Sequence Number, SN, wherein the number of PDCP PDUs are taken from a first set of PDCP PDUs comprising one or more first time transmitted PDCP PDUs and from a second set of PDCP PDUs comprising one or more retransmitted PDCP PDUs, and wherein the one or more first time transmitted PDCP PDUs and the one or more retransmitted PDCP PDUs are received from a controlling node, e.g. a central Unit, CU, e.g. comprised in the network node (110) or connected to the network node (110) and configured to operate in the wireless communications network (100); e.g. by means of a ordering and/or arranging and/or putting unit in the network node 110, and
 transmit the number of the PDCP PDUs in the numerical order to the wireless communications device (120) e.g. by means of the transmitting unit in the network node 110.

Embodiment 5

The network node (110) of embodiment 4, further configured to:
receive, from the CU, a PDCP PDU e.g. by means of the receiving unit in the network node 110;

determine whether the received PDCP PDU is a first time transmitted PDCP PDU or a retransmitted PDCP PDU; e.g. by means of the determining unit in the network node 110 arrange a determined received first time transmitted PDCP PDU last in the first set of PDCP PDUs, wherein the first set of PDCP PDUs is a first time transmission queue; e.g. by means of the arranging unit in the network node 110, and arrange a determined received retransmitted PDCP PDU last in the second set of PDCP PDUs, wherein the second set of PDCP PDUs is a retransmission queue e.g. by means of the arranging unit in the network node 110.

Embodiment 6

The network node (110) of embodiment 4 or 5, wherein the PDCP PDU is configured to comprise an indication, e.g. a flag, indicating whether the PDCP PDU is first time transmitted or retransmitted.

Embodiment 7

A computer program, comprising instructions which, when executed on at least one processor, causes the at least one processor to carry out the method according to any one of embodiments 1-3.

Embodiment 8

A carrier comprising the computer program of embodiment 7, wherein the carrier is one of an electronic signal, an optical signal, a radio signal, or a computer readable storage medium Embodiment 9

The network node (110) according to any of the embodiments 4-6, further being configured to arrange of the number of PDCP PDUs in a numerical order based on their respective PDCP SN when being triggered at a selected event comprising anyone or more out of:
a retransmitted PDCP PDU arrives to an empty retransmission queue,
a preconfigured time at which time a predefined number of PDUs have arrived in the Retransmission queue,
when a predefined number of PDCP PDUs have arrived in the Retransmission queue, and
when there are PDCP PDU(s) in the Retransmission queue.

Embodiment 10

The network node (110) according to any of embodiments 4-6 or 9, further being configured to:
analyse the PDCP SN of PDCP PDUs in both a first time transmission queue, and a retransmission queue e.g. by means of the arranging unit in the network node 110.

Embodiment 11

The network node (110) according to embodiment 10, further being configured to arrange the number of PDCP PDUs in a numerical order based on their respective PDCP SN by reallocating the analysed PDUs in a new queue, based on PDCP SN of each PDU.

| Abbreviation | Explanation |
| --- | --- |
| CU-UP | Centralized Unit - User Plane |
| DU | Distributed Unit |
| SN | Sequence Number |

Further Extensions and Variations

Figure 8:
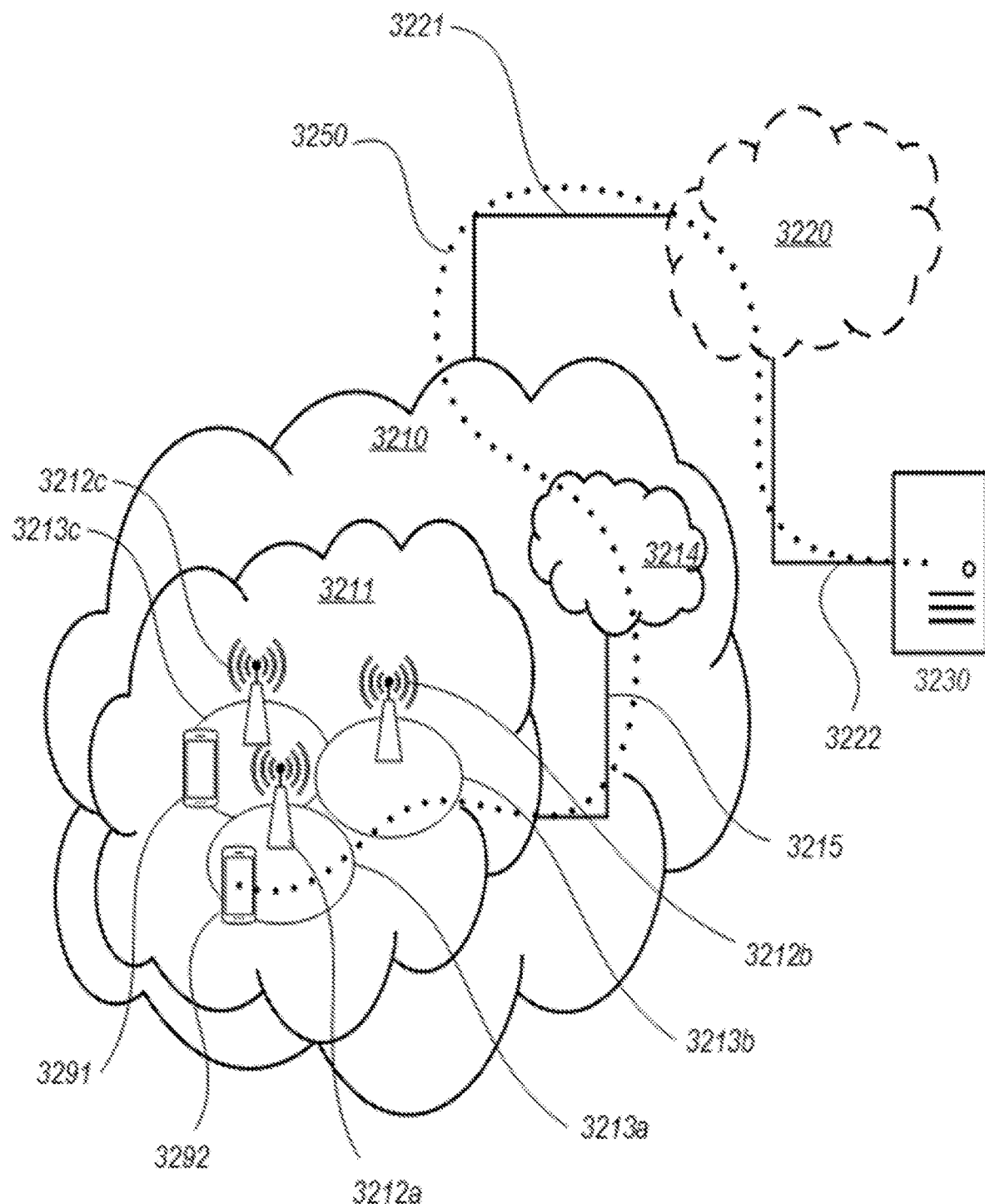
FIG. 8 schematically illustrates a telecommunication network connected via an intermediate network to a host computer.

With reference to FIG. 8, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
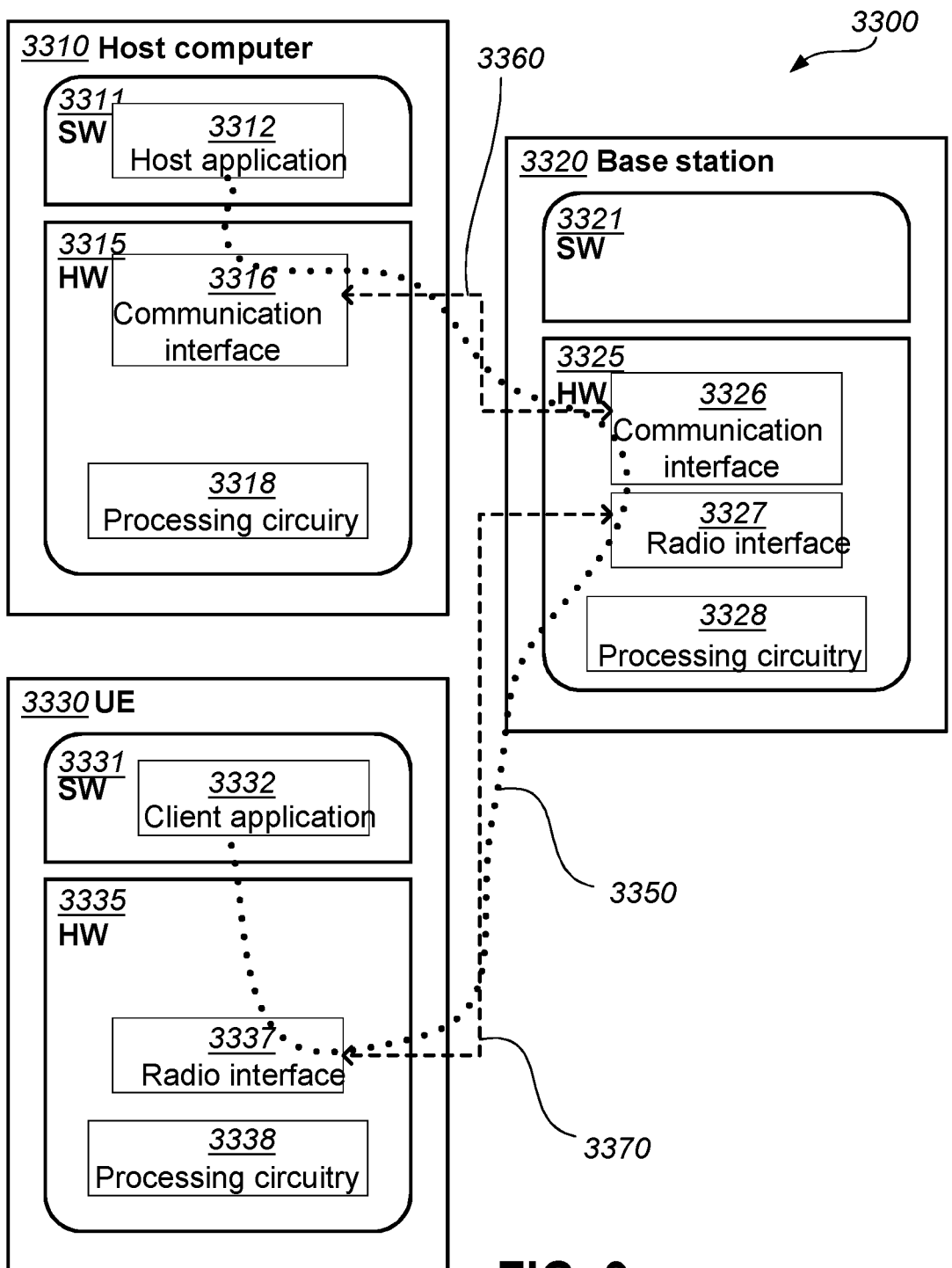
FIG. 9 is a generalized block diagram of a host computer communicating via a base station with a user equipment over a partially wireless connection.
Figures 10, 11:
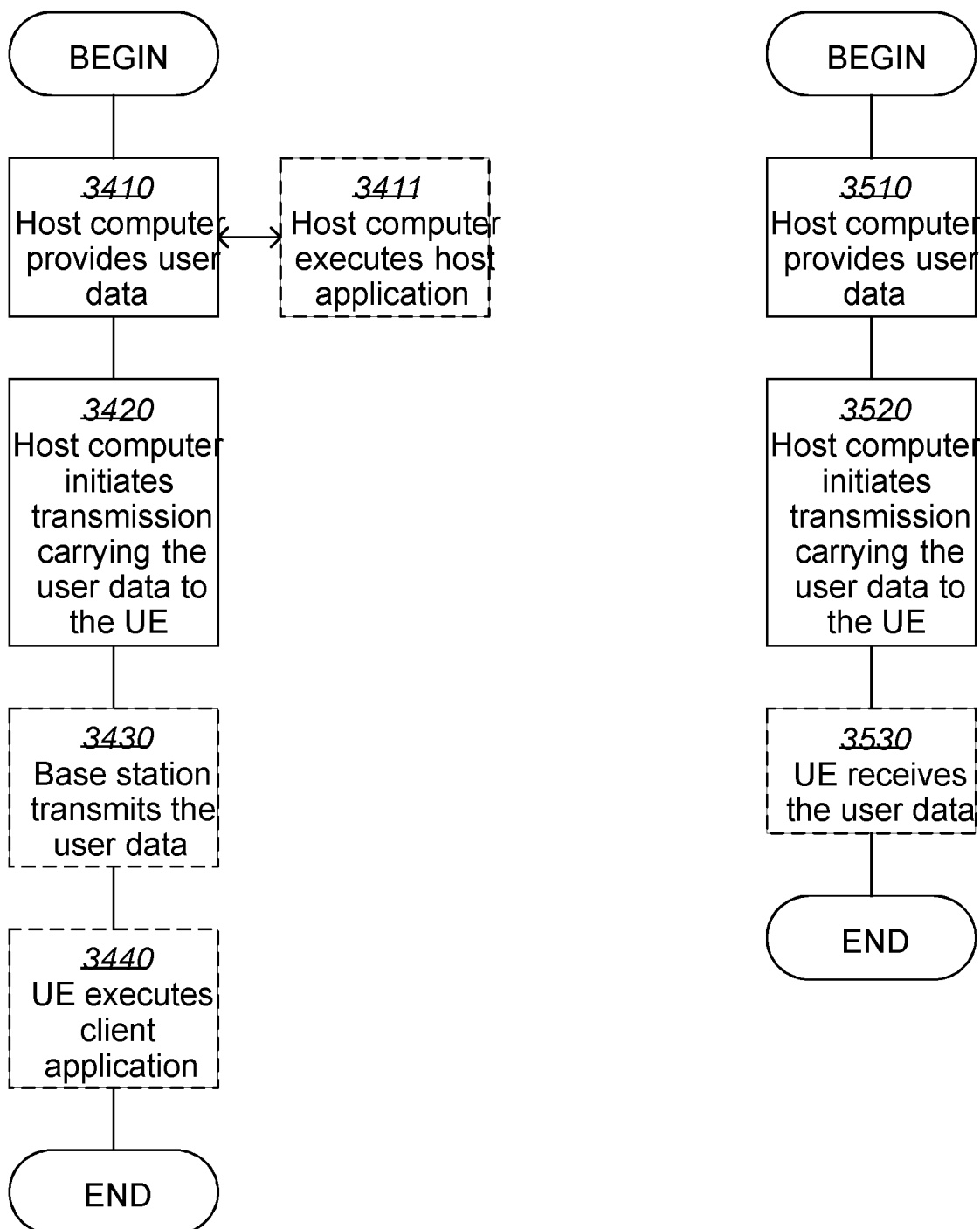

It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 10, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station such as the network node 110, and a UE such as the UE 120, which may be those described with reference to FIG. 8 and FIG. 9. For simplicity of the present disclosure, only drawing references to FIG. 10 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 11 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 12 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 13 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a network node for transmission of a Packet Data Convergence Protocol (PDCP) Protocol Data Unit (PDU) to a wireless communications device, wherein the network node and the wireless communications device operate in a wireless communications network, the method comprising:
    arranging a number of PDCP PDUs in a numerical order based on their respective PDCP Sequence Number (SN), wherein the number of PDCP PDUs are taken from a first set of PDCP PDUs comprising one or more first time transmitted PDCP PDUs and from a second set of PDCP PDUs comprising one or more retransmitted PDCP PDUs, and wherein the one or more first time transmitted PDCP PDUs and the one or more retransmitted PDCP PDUs are received from a controlling node; and
    transmitting the number of the PDCP PDUs in the numerical order to the wireless communications device.

2. The method according to claim 1, wherein the controlling node is represented by a Central Unit (CU), wherein the CU is comprised in the network node or is connected to the network node and operating in the wireless communications network.

3. The method according to claim 1, wherein arranging the number of PDCP PDUs in a numerical order based on their respective PDCP SN is triggered at a selected event comprising any one or more out of:
    a retransmitted PDCP PDU arrives to an empty retransmission queue;
    a preconfigured time at which time a predefined number of PDUs have arrived in the retransmission queue;
    when a predefined number of PDCP PDUs have arrived in the retransmission queue, and
    when there are PDCP PDU(s) in the retransmission queue.

4. The method according to claim 1, further comprising:
    receiving a PDCP PDU from the controlling node;
    determining whether the received PDCP PDU is a first time transmitted PDCP PDU or a retransmitted PDCP PDU;
    arranging a determined received first time transmitted PDCP PDU last in the first set of PDCP PDUs, wherein the first set of PDCP PDUs is a first time transmission queue; and
    arranging a determined received retransmitted PDCP PDU last in the second set of PDCP PDUs, wherein the second set of PDCP PDUs is a retransmission queue.

5. The method according to claim 1, further comprising analyzing the PDCP SN of PDCP PDUs in both a first time transmission queue and a retransmission queue.

6. The method according to claim 5, wherein the arranging of the number of PDCP PDUs in a numerical order based on their respective PDCP SN comprises reallocating the analyzed PDUs in a new queue, based on a PDCP SN of each PDU.

7. The method according to claim 1, wherein a PDCP PDU received from the controlling node comprises an indication that indicates whether the PDCP PDU is first time transmitted or retransmitted.

8. The method according to claim 1, wherein the network node is represented by a Distributed Unit (DU) or comprises a DU.

9. The method according to claim 1, wherein the wireless communications network relates to any one out of:
  a communications network providing dual connectivity; or
  a communications network wherein PDCP and lower layers are in different nodes or in different software functions.

10. A non-transitory computer-readable storage medium on which is stored a computer program, the computer program comprising instructions, which when executed by a processor of a network node, causes the network node to:
  arrange a number of Packet Data Convergence Protocol (PDCP) Protocol Data Units (PDUs) in a numerical order based on their respective PDCP Sequence Number (SN), wherein the number of PDCP PDUs are taken from a first set of PDCP PDUs comprising one or more first time transmitted PDCP PDUs and from a second set of PDCP PDUs comprising one or more retransmitted PDCP PDUs, and wherein the one or more first time transmitted PDCP PDUs and the one or more retransmitted PDCP PDUs are received from a controlling node; and
  transmitting the number of the PDCP PDUs in the numerical order to a wireless communications device.

11. A network node configured for transmission of a Packet Data Convergence Protocol (PDCP) Protocol Data Unit (PDU) to a wireless communications device, wherein the network node and the wireless communications device are configured to operate in a wireless communications network, wherein the network node comprises processing circuitry configured to:
  arrange a number of PDCP PDUs in a numerical order based on their respective PDCP Sequence Number (SN), wherein the number of PDCP PDUs are taken from a first set of PDCP PDUs comprising one or more first time transmitted PDCP PDUs and from a second set of PDCP PDUs comprising one or more retransmitted PDCP PDUs, and wherein the one or more first time transmitted PDCP PDUs and the one or more retransmitted PDCP PDUs are received from a controlling node; and
  transmit the number of the PDCP PDUs in the numerical order to the wireless communications device.

12. The network node according to claim 11, wherein the controlling node is represented by a Central Unit (CU), wherein the CU is comprised in the network node or is connected to the network node and operates in the wireless communications network.

13. The network node according to claim 11, wherein the processing circuitry is further configured to arrange the number of PDCP PDUs in a numerical order based on their respective PDCP SN when being triggered at a selected event comprising anyone or more out of:
  a retransmitted PDCP PDU arrives to an empty retransmission queue;
  a preconfigured time at which time a predefined number of PDUs have arrived in the retransmission queue;
  when a predefined number of PDCP PDUs have arrived in the retransmission queue; and
  when there are PDCP PDU(s) in the retransmission queue.

14. The network node according to claim 11, wherein the processing circuitry is further configured to:
  receive, from the controlling node, a PDCP PDU;
  determine whether the received PDCP PDU is a first time transmitted PDCP PDU or a retransmitted PDCP PDU;
  arrange a determined received first time transmitted PDCP PDU last in the first set of PDCP PDUs, wherein the first set of PDCP PDUs is a first time transmission queue, and
  arrange a determined received retransmitted PDCP PDU last in the second set of PDCP PDUs, wherein the second set of PDCP PDUs is a retransmission queue.

15. The network node according to claim 11, wherein the processing circuitry is further configured to analyze the PDCP SN of PDCP PDUs in both a first time transmission queue and a retransmission queue.

16. The network node according to claim 15, wherein the processing circuitry is further configured to arrange the number of PDCP PDUs in a numerical order based on their respective PDCP SN by reallocating the analyzed PDUs in a new queue, based on PDCP SN of each PDU.

17. The network node of claim 11, wherein the PDCP PDU is configured to comprise an indication that indicates whether the PDCP PDU is first time transmitted or retransmitted.

18. The network node according to claim 11, wherein the network node is represented by a Distributed Unit (DU) or comprises a DU.

19. The network node according to claim 11, wherein the wireless communications network relates to any one out of:
  a communications network providing dual connectivity; or
  a communications network wherein PDCP and lower layers are in different nodes or in different software functions.

* * * * *